(12) United States Patent
Kato et al.

(10) Patent No.: US 7,172,695 B2
(45) Date of Patent: Feb. 6, 2007

(54) LIQUID TREATING APPARATUS

(75) Inventors: Yoshinari Kato, Mizunami (JP); Satoshi Kameshima, Mizunami (JP); Mitsuro Hyakumachi, Gifu (JP); Yoshihiro Taguchi, Gifu (JP); Hideki Watanabe, Mizuho (JP); Hayato Horinouchi, Anpachi-gun (JP)

(73) Assignee: Akechi Ceramics Kabushiki Kaisha, Gifu (JP)

( * ) Notice: Subject to any disclaimer, the term of this patent is extended or adjusted under 35 U.S.C. 154(b) by 0 days.

(21) Appl. No.: 10/805,141

(22) Filed: Mar. 19, 2004

(65) Prior Publication Data
US 2004/0188338 A1    Sep. 30, 2004

(30) Foreign Application Priority Data
Mar. 27, 2003    (JP) ............................. 2003-088513

(51) Int. Cl.
*B01D 24/04* (2006.01)

(52) U.S. Cl. ...................... 210/260; 210/266; 210/287; 210/501

(58) Field of Classification Search ............... 210/259, 210/260, 266, 282, 283, 284, 287, 290, 501, 210/502.1
See application file for complete search history.

(56) References Cited

U.S. PATENT DOCUMENTS

| | | | | |
|---|---|---|---|---|
| 4,196,081 A | * | 4/1980 | Pavia | 210/94 |
| 4,540,489 A | * | 9/1985 | Barnard | 210/287 |
| 4,828,698 A | * | 5/1989 | Jewell et al. | 210/266 |
| 5,006,245 A | | 4/1991 | Yukishita | 210/256 |
| 5,064,534 A | | 11/1991 | Busch et al. | 210/266 |
| 5,635,063 A | * | 6/1997 | Rajan et al. | 210/266 |

FOREIGN PATENT DOCUMENTS

| | | |
|---|---|---|
| CH | 339 888 | 7/1959 |
| EP | 0 852 222 | 7/1998 |
| JP | 4-70187 | 6/1992 |
| JP | 2000-342917 | 12/2000 |
| WO | WO 01/23307 | 4/2001 |

* cited by examiner

*Primary Examiner*—Ivars C. Cintins
(74) *Attorney, Agent, or Firm*—Koda & Androlia

(57) ABSTRACT

A liquid treating apparatus includes a treating tank having at least two walls formed with a liquid inlet and a liquid outlet through each of which a liquid to be treated flows, respectively, and a filtering layer unit including an antibacterial filtering layer, an adsorptive filtering layer and a filtering layer, the filtering layer unit being disposed between the liquid inlet and outlet.

9 Claims, 4 Drawing Sheets

LIQUID TREATING APPARATUS

BACKGROUND OF THE INVENTION

1. Field of the Invention

This invention relates to a liquid treating apparatus carrying out an antibacterial treatment against disease bacteria or fungi and protozoan present in a liquid and a treatment for elimination of impurities.

2. Description of the Related Art

Crop growth using a nutrient solution such as hydroponics or rockwool growth systems has recently been conspicuous in the field of agriculture. With this, crops have adversely been affected by disease bacteria in an increasing number of cases. The disease bacteria invade from used raw water or from environment of such growth systems and propagate in a recirculated liquid used in the systems. Further, problems have arisen of adverse effects of bacteria and filamentous fungi on human bodies. The adverse effects include hospital infection due to legionella bacteria propagated in raw practical use water or methicillin-resistant staphylococcus aureus (MRSA) and food poisoning due to enterohemorrhagic escherichia O-157 or staphylococcus aureus. In view of the foregoing problems, the prior art has proposed bactericidal methods using chlorine chemicals, organic chemicals or the like, sterilizing methods using a sand filter, nutrient solution sterilizing methods using a bactericidal system by the use of ozone or ultraviolet lamps.

However, the above-noted bactericidal methods using chlorine chemicals are quick-acting but not persistent in the effect. Accordingly, the chlorine chemicals need to be used continuously but this increases the costs. Further, the chlorine chemicals have the defect of accelerating production of carcinogenic trihalometane. In the bactericidal methods using organic chemicals, drainage of the re-circulated liquid containing the organic chemicals has an enormous influence upon the environment. Further, in physical methods of adsorbing bacteria using various types of filter media, the accuracy in the filtration is insufficient and currently ineffective. Moreover, equipment carrying out the methods is large in size. Accordingly, an initial cost is increased. Additionally, the methods using ozonized water are not persistent in the effect and result in an increase in the cost, too. Additionally, in the bactericidal methods using ozone or ultraviolet lamps, control of nutrient solution becomes difficult since the ozone or ultraviolet lamps induce deposition of a slight amount of element.

SUMMARY OF THE INVENTION

Therefore, an object of the present invention is to provide a liquid treating apparatus which can reduce propagation of disease bacteria and which is inexpensive.

The present invention provides a liquid treating apparatus comprising a treating tank having at least two walls formed with a liquid inlet and a liquid outlet through each of which a liquid to be treated flows, respectively, and a filtering layer unit including an antibacterial filtering layer, an adsorptive filtering layer and a filtering layer, the filtering layer unit being disposed between the liquid inlet and outlet.

The liquid to be treated is caused to flow through the filtering layer unit including the antibacterial filtering layer, the adsorptive filtering layer and the filtering layer and disposed between the liquid inlet and outlet. Thus, three or more antibacterial, adsorptive and filtering effects are achieved. The antibacterial filtering layer supplements the filtering effect of the filtering layer as well as has the antibacterial effect on disease bacteria present in the re-circulated liquid. The adsorptive filtering layer adsorbs disease bacterial as well as organic substances and has a filtering effect. Furthermore, in general, a sufficient effect cannot be achieved from a small-sized filtering layer. In the above-described construction, however, a sufficient filtering effect can be achieved from a compact combination of the filtering layer, the antibacterial filtering layer supplementing the filtering layer and the adsorptive filtering layer also having a filtering effect.

In a preferred form, the liquid treating apparatus further comprises a pretreatment tank disposed upstream relative to the treating tank and having at least two walls formed with a liquid inlet and a liquid outlet through each of which a liquid to be treated flows, respectively, and a rough filtration layer which is provided so as to surround the liquid outlet in the pretreatment tank and is capable of catching a grain which is contained in the liquid and has a grain size not less than 0.5 mm. Consequently, a frequency in replacement of each filtering layer due to clogging can be reduced, whereupon the maintenability of the overall apparatus can be improved.

In another preferred form, the antibacterial filtering layer contains an antibacterial agent comprising an inorganic material serving as a carrier such as ceramic and silver or copper carried on the carrier and having an elution volume of antibacterial component not more than 50 ppb. Consequently, even when the apparatus is kept used for a long period of time, the environment can be prevented from being adversely affected.

In further another preferred form, the adsorptive filtering layer includes an adsorbing material having a large specific surface area. Consequently, organic substances and disease bacteria can be adsorbed at a high efficiency.

In further another preferred form, the filtering layer includes a filter medium catching not less than 90% of grain having a grain size not less than 10 µm. The liquid to be treated is caused to pass continuously through the antibacterial and adsorptive filtering layers each catching unnecessary grains in the liquid to be treated. When the filtering layer is disposed upstream relative to the antibacterial and adsorptive filtering layers, the antibacterial and adsorptive filtering layers can be prevented from being clogged.

In further another preferred form, the antibacterial filtering layer, the adsorptive filtering layer and the filtering layer are attachable and detachable independent of one another. Consequently, the maintenability of the overall apparatus can further be improved.

BRIEF DESCRIPTION OF THE DRAWINGS

Other objects, features and advantages of the present invention will become clear upon reviewing the following description of the embodiment with reference to the accompanying drawings, in which.

DETAILED DESCRIPTION OF THE INVENTION

Figure 1:
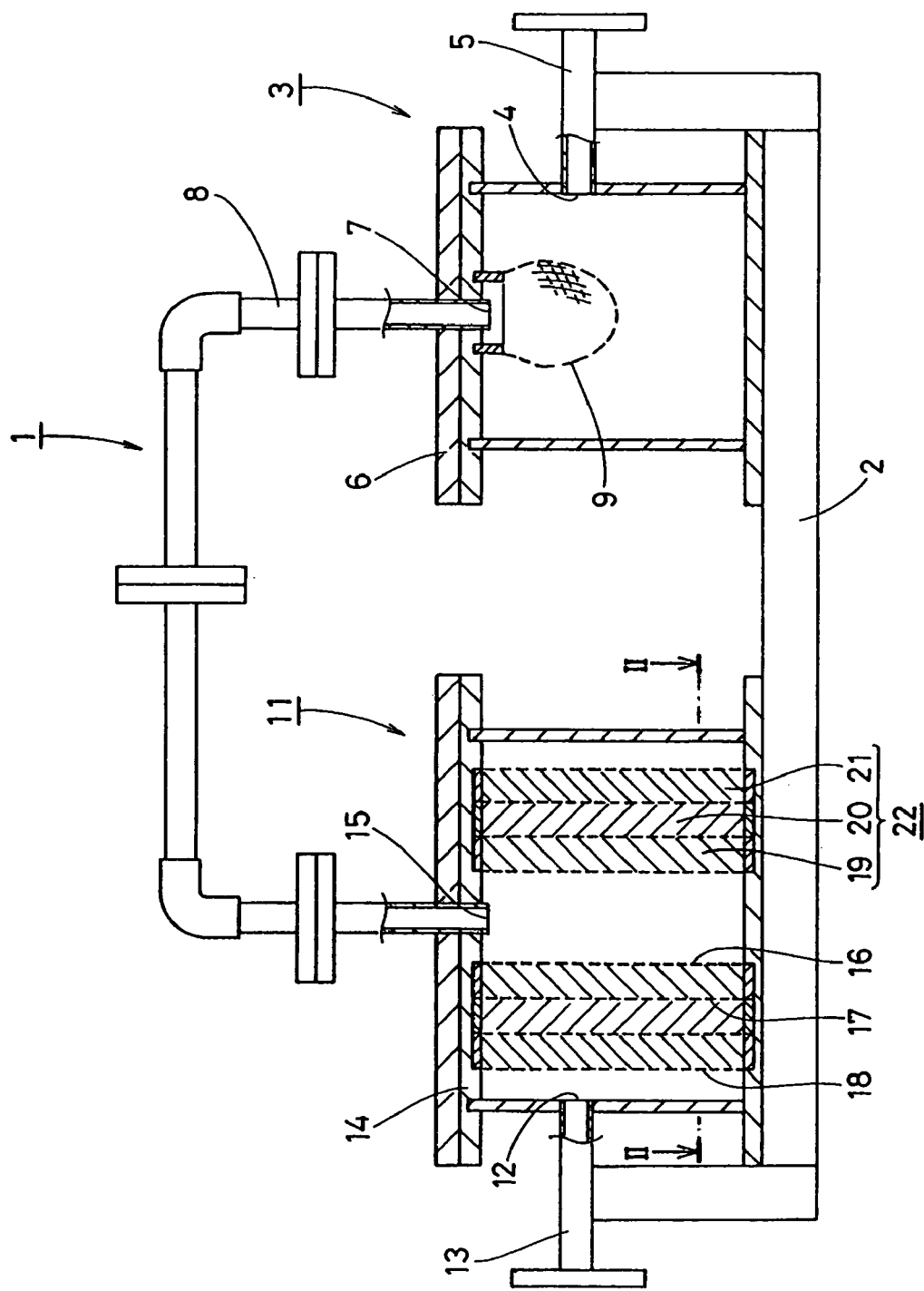
FIG. 1 is a partially broken sectional view of the liquid treating apparatus in accordance with one embodiment of the present invention.
Figure 2:
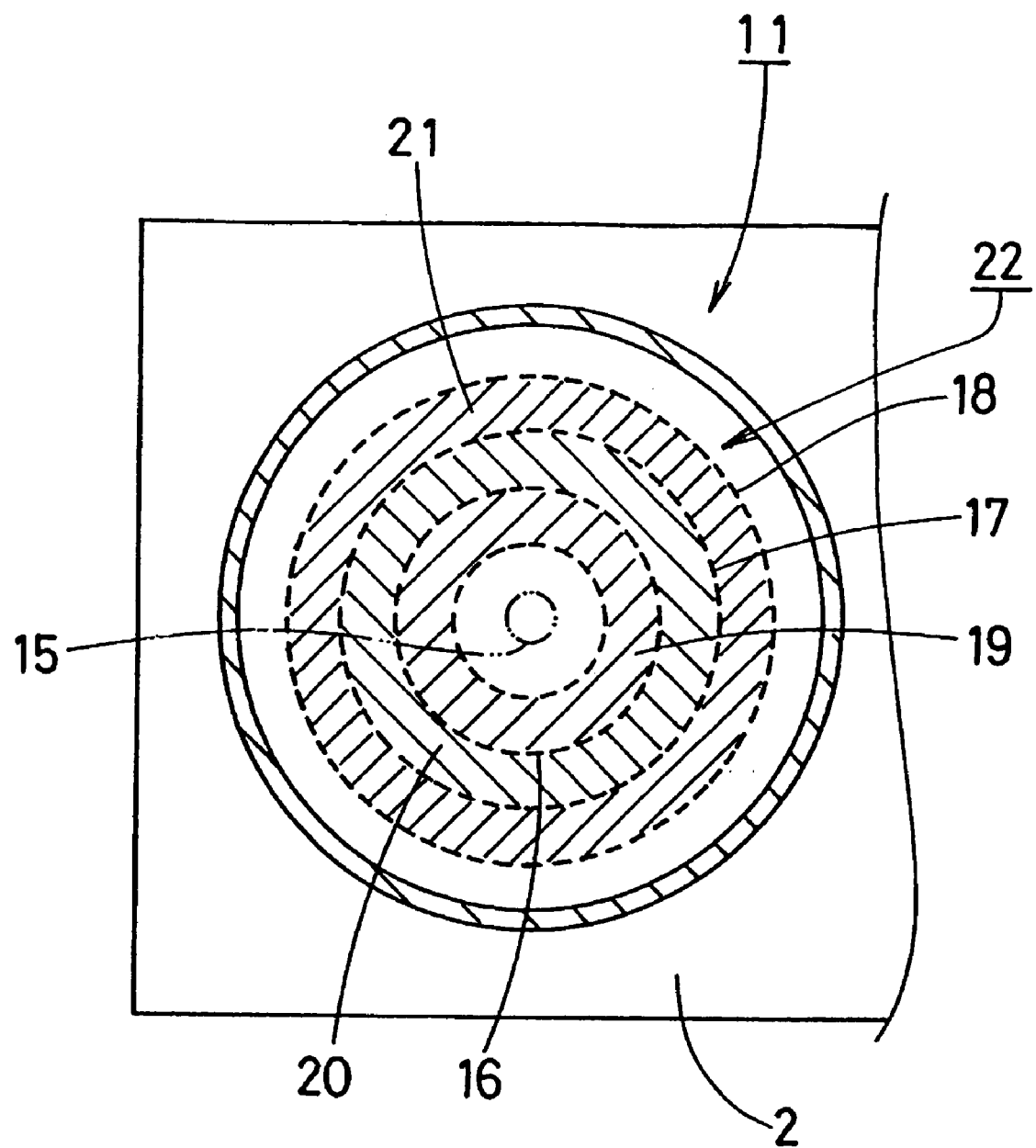
FIG. 2 is a sectional view taken along line II—II in FIG. 1.

One embodiment of the present invention will be described with reference to the accompanying drawings. Referring to FIG. 1, a liquid treating apparatus 1 of the embodiment comprises a base 2, a first or rough treatment or pretreatment tank 3 and a second or filtration tank 11. The rough treatment tank 3 and the filtration tank 11 are juxtaposed on the base 2. The rough treatment tank 3 has a side wall formed with a through hole serving as an inlet 4 through which a liquid to be treated is supplied into the rough treatment tank 3. To the inlet 4 is connected a connecting pipe 5 to which supply piping (not shown) for supply of the liquid to be treated is further connected. A cover 6 constituting a top wall or ceiling is mounted to the top of the rough treatment tank 3 so as to close a top opening of the tank 3 in a watertight manner. The cover 6 has a through hole serving as an outlet 7 through which the liquid to be treated is discharged from the rough treatment tank 3. One end of discharge piping 8 is connected to the outlet 7. A rough treatment metal mesh bag 9 is hung on the underside of the cover 6 so as to surround the outlet 7. The mesh bag 9 serves as a rough treatment filtering layer in the invention.

The filtration tank 11 includes a side wall formed with a through hole or an outlet 12. To the outlet 12 is connected a connecting pipe 13 to which discharge piping (not shown) for discharge of the already treated liquid is further connected. A cover 14 constituting a top wall or ceiling of the filtration tank 11 is mounted to the top of the filtration tank 11 so as to close a top opening of the tank 11 in a watertight manner. The cover 14 has a centrally formed through hole serving as an inlet 15 to which the other end of the discharge piping 8 is connected.

Three cylindrical wire net baskets 16, 17 and 18 are concentrically disposed in the filtration tank 11 about a central axis of the tank so as to be attachable and detachable. The wire net baskets 16, 17 and 18 have the same height substantially equal to that of the filtration tank 11. The innermost basket 16 has an inner diameter larger than an outer diameter of the inlet 15 so that the interior of the basket 16 is filled with the liquid to be treated. A predetermined space is defined between an outer circumferential wall of the outermost basket 18 and the inner circumferential wall of the filtration tank 11 so that the filtered liquid smoothly flows out of the outlet 12.

Each of the baskets 16 to 18 is made of a stainless net with meshes of 0.5 mm square. The innermost basket 16 encloses a filtering layer 19 comprising a felt filter having a filtration accuracy of 10 μm and inserted into the innermost basket 16. The middle basket 17 encloses an adsorptive filtering layer 20 filled with activated carbon made from coconut husks. The used activated carbon has a large specific surface area of 950 m$^2$/g and an average grain size of 3 mm. Additionally, the outermost basket 18 encloses an antibacterial layer 21 filled with antibacterial sand. The antibacterial sand is made by coating sodium borosilicate glass with dispersed inorganic silver antibacterial agent onto aluminum oxide powder having an average grain size of 0.5 mm and holding the coated aluminum oxide powder at 750° C. for two hours. The filtering layer 19, adsorptive filtering layer 20 and antibacterial filtering layer 21 constitute a filtration layer unit 22. The filtering layer 19, adsorptive filtering layer 20 and antibacterial filtering layer 21 through each of which the liquid to be treated passes have the same filtration volume of 1500 cm$^3$.

Grain having the grain size not less than 0.5 mm is caught by the rough treatment metal mesh bag 9 of the rough treatment tank 3, thereby being eliminated from the liquid to be treated. Subsequently, the liquid flows through the discharge piping 8, entering the filtration tank 11 via the inlet 15. In the filtration tank 11, the liquid passes through the sequence of the filtering layer 19, the adsorptive filtering layer 20 and the antibacterial filtering layer 21 thereby to be filtered, thereafter being discharged through the outlet 12.

The above-described liquid treating apparatus 1 of the embodiment was compared with compared examples 1 to 6 of liquid treating apparatus.

In the liquid treating apparatus of compared example 1, the filtration tank 11 enclosed only an antibacterial filtering layer 21 having a filtration volume of 4500 cm$^3$. The construction of the liquid treating apparatus of compared example 1 was the same as that of the embodiment apparatus 1 in the other respects.

In the liquid treating apparatus of compared example 2, the filtration tank 11 enclosed only an adsorptive filtering layer 20 having a filtration volume of 4500 cm$^3$. The construction of the liquid treating apparatus of compared example 2 was the same as that of the embodiment apparatus 1 in the other respects.

In the liquid treating apparatus of compared example 3, the filtration tank 11 enclosed only a filtering layer 19 having a filtration volume of 4500 cm$^3$. The construction of the liquid treating apparatus of compared example 3 was the same as that of the embodiment apparatus 1 in the other respects.

Figure 3:
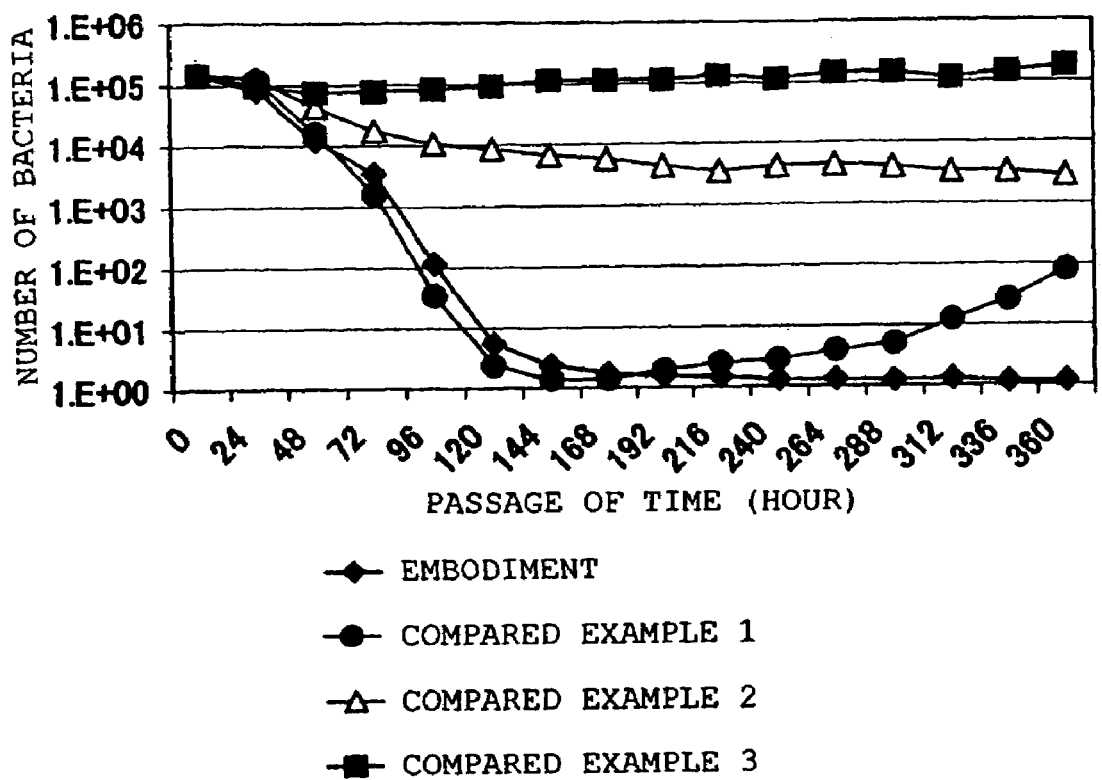
FIG. 3 is a graph showing comparison of antibacterial effect.

The embodiment apparatus and the liquid treating apparatus of the compared examples 1 to 3 were incorporated into respective ebb-and-flow hydroponic growth systems each having crop acreage of 10 m$^2$. Furthermore, the number of zoo spores (Pythium) of Fusarium oxysporum contained in used raw water was adjusted to $10^5$/lit. and the number of bacteria was measured with the passage of time. FIG. 3 shows the results of measurement.

As obvious from FIG. 3, the antibacterial effect and persistence of the effect were confirmed with respect to the embodiment apparatus. In the liquid treating apparatus of compared example 1, the filtration tank 11 enclosed only the antibacterial filtering layer 21. As a result, an initial antibacterial effect was achieved but a problem was found in the persistence of the effect. Regarding the compared examples 2 and 3, a sufficient antibacterial effect was not obtained.

On the other hand, in the liquid treating apparatus of compared example 4, the outermost wirenet basket 18 enclosed an antibacterial layer 21 filled with antibacterial sand. The antibacterial sand was made by coating boric acid glass with dispersed inorganic silver antibacterial agent onto aluminum oxide powder having an average grain size of 0.5 mm and holding the coated aluminum oxide powder at 750° C. for two hours. The construction of the liquid treating apparatus of compared example 4 was the same as that of the embodiment apparatus 1 in the other respects. An elution volume of silver was measured regarding the embodiment apparatus and the liquid treating apparatus of compared example 4. The following TABLE 1 shows the results of measurement.

TABLE 1

| Specimen | Eluted component (ppb) Ag |
|---|---|
| Embodiment apparatus | 10 |
| Compared example 4 | 1500 |

When an elution volume of silver component exceeds 50 ppb, a continuous use of the liquid treating apparatus for a long period of time results in environmental contamination and moreover, a reduction in the antibacterial component would reduce the antibacterial effect. Accordingly, compared example 4 is improper as a liquid treating apparatus.

In the liquid treating apparatus of compared example 5, the filtration accuracy of the filtering medium used in the filtering layer 19 was set to 100 µm. The construction of the liquid treating apparatus of compared example 5 was the same as that of the embodiment apparatus 1 in the other respects. No rough treatment tank 3 was provided in the liquid treating apparatus of compared example 6. The construction of the liquid treating apparatus of compared example 6 was the same as that of the embodiment apparatus 1 in the other respects.

Figure 4:
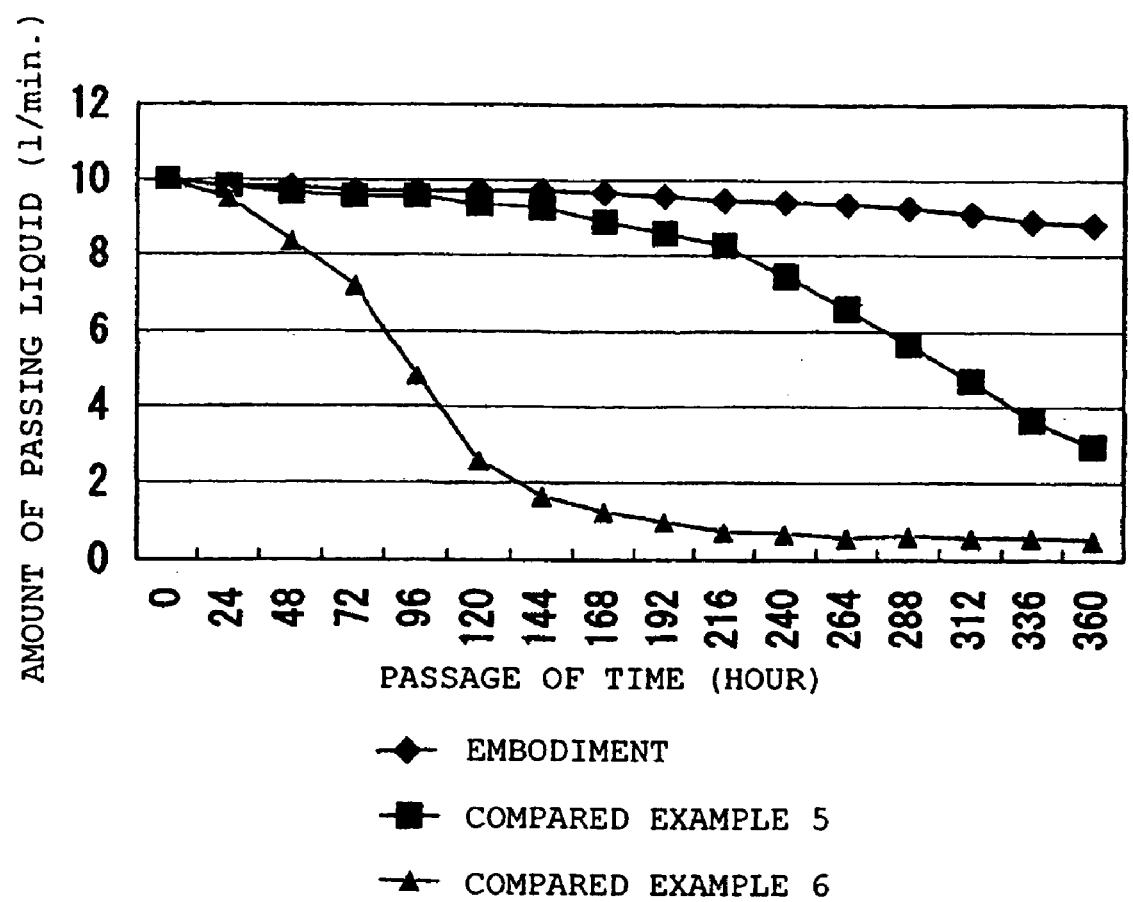
FIG. 4 is a graph showing comparison in an amount of liquid passing through a filter.

An amount of liquid flowing through a filter with passage of time was measured concerning the embodiment apparatus and the liquid treating apparatus of compared examples 5 and 6. FIG. 4 shows the results of measurement. As obvious from FIG. 4, a reduction in the amount of liquid flowing through the filter is gentle in the embodiment apparatus 1. However, in the liquid treating apparatus of compared embodiment 5 with the filtration accuracy of 100 µm, a reduction ratio of the amount of liquid flowing through the filter is increased upon lapse of 200 hours. Further, the amount of liquid flowing through the filter is rapidly reduced in the liquid treating apparatus of compared example 6 without the rough treatment tank 3.

In the above-described liquid treating apparatus 1, propagation of disease bacteria invading from the raw water or cultivation environment can efficiently be prevented by a compact construction of the rough treatment tank 3 and the filtration tank 11. Further, since the filtration tank 11 is disposed downstream relative to the rough treatment tank 3, clogging of the filtering, adsorptive filtering and antibacterial filtering layers 19, 20 and 21 can be retarded. Additionally, since the three cylindrical wire net baskets 16, 17 and 18 are concentrically disposed in the filtration tank 11 so as to be attachable and detachable, the maintenability of the apparatus 1 including replacement of the filter layers 19 to 21 can be improved and the frequency of replacement can be reduced.

The filtering layer 19 comprises the felt filter having a filtration accuracy of 10 µm and inserted into the innermost basket 16. As a result, the filtering layer 19 can catch not less than 90% of grain having a grain size not less than 10 µm. Further, the adsorptive filtering layer 20 is filled with activated carbon which is made from coconut husks and has a large specific surface area of 950 m$^2$/g and an average grain size of 3 mm. Consequently, organic substances and disease bacteria can be adsorbed at a high efficiency. Activated carbon, zeolite or the like can serve as a substance with a large specific surface area. Additionally, the antibacterial layer 21 is filled with the antibacterial sand made by coating sodium borosilicate glass with dispersed inorganic silver antibacterial agent onto aluminum oxide powder having an average grain size of 0.5 mm and holding the coated aluminum oxide powder at 750° C. for two hours. Consequently, the environment can be prevented from being adversely affected by the liquid treating apparatus 1 even when the antibacterial layer 21 is used for a long period of time after an elution volume of silver serving as the antibacterial component has been reduced to or below 50 ppb. Further, since no chemicals resulting in serious influence upon the environment are used, disease bacteria can be eliminated at low costs.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A liquid treating apparatus comprising:
    a treating tank having at least two walls formed with a liquid inlet and a liquid outlet through each of which a liquid to be treated flows, respectively; and
    a filtering layer unit including an antibacterial filtering layer, an adsorptive filtering layer and a filtering layer, the filtering layer unit being disposed between the liquid inlet and outlet; and
    wherein the antibacterial filtering layer comprises an antibacterial agent comprising a ceramic material serving as a carrier and silver carried on the carrier as an antibacterial component and said ceramic material is aluminum oxide powder, said antibacterial component comprises sodium borosilicate glass with dispersed inorganic silver and said antibacterial component is coated onto said aluminum oxide powder.

2. A liquid treating apparatus according to claim 1, further comprising a pretreatment tank disposed upstream relative to the treating tank and having at least two walls formed with a liquid inlet and a liquid outlet through each of which a liquid to be treated flows, respectively, and a rough filtration layer which is provided so as to surround the liquid outlet in the pretreatment tank and is capable of catching a grain which is contained in the liquid and has a grain size not less than 0.5 mm.

3. A liquid treating apparatus according to claim 2, wherein the adsorptive filtering layer includes an adsorbing material having a specific surface area substantially equal to 950 m$^2$/g.

4. A liquid treating apparatus according to claim 3, wherein the filtering layer includes a filter medium catching not less than 90% of grain having a grain size not less than 10 µm.

5. A liquid treating apparatus according to claim 2, wherein the filtering layer includes a filter medium catching not less than 90% of grain having a grain size not less than 10 µm.

6. A liquid treating apparatus according to claim 1, wherein the adsorptive filtering layer includes an adsorbing material having a specific surface area substantially equal to 950 m$^2$/g.

7. A liquid treating apparatus according to claim 6, wherein the filtering layer includes a filter medium catching not less than 90% of grain having a grain size not less than 10 µm.

8. A liquid treating apparatus according to claim 1, wherein the filtering layer includes a filter medium catching not less than 90% of grain having a grain size not less than 10 µm.

9. A liquid treating apparatus according to any one of claims 1, 2, 6, 8, 5, 7 and 4, wherein the antibacterial filtering layer, the adsorptive filtering layer and the filtering layer are attachable and detachable independent of one another.

* * * * *